(12) United States Patent
Bauer et al.

(10) Patent No.: US 6,616,218 B2
(45) Date of Patent: Sep. 9, 2003

(54) BASE PASSIVE POROSITY FOR VEHICLE DRAG REDUCTION

(75) Inventors: Steven X. S. Bauer, Yorktown, VA (US); Richard M. Wood, Virginia Beach, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/951,857

(22) Filed: Sep. 13, 2001

(65) Prior Publication Data

US 2002/0005655 A1 Jan. 17, 2002

(51) Int. Cl.⁷ .............................................. B62D 35/00
(52) U.S. Cl. ................ 296/180.1; 296/180.4; 180/903; 105/1.1
(58) Field of Search .......................... 296/180.1, 180.4; 180/903; 105/1.1

(56) References Cited

U.S. PATENT DOCUMENTS

| | | | | | |
|---|---|---|---|---|---|
| 926,971 | A | * | 7/1909 | Ahrens | 296/180.4 |
| 2,361,924 | A | * | 11/1944 | Boynton | 296/180.1 |
| 2,514,695 | A | * | 7/1950 | Dempsey | 296/180.4 |
| 3,348,622 | A | * | 10/1967 | Papst | 296/180.1 |
| 4,384,630 | A | * | 5/1983 | Steiner | 296/180.1 |
| 4,460,055 | A | * | 7/1984 | Steiner | 296/180.1 |
| 4,861,088 | A | * | 8/1989 | Fedrigo | 296/57.1 |
| 5,407,245 | A | * | 4/1995 | Geropp | 296/180.1 |

FOREIGN PATENT DOCUMENTS

| | | | | |
|---|---|---|---|---|
| DE | 3115742 | * | 11/1982 | 296/180.4 |
| FR | 788753 | * | 10/1935 | 296/180.4 |
| NL | 56947 | * | 9/1944 | 296/180.1 |

* cited by examiner

Primary Examiner—Dennis H. Pedder
(74) Attorney, Agent, or Firm—Helen M. Galus; Barry V. Gibbens

(57) ABSTRACT

A device for controlling drag on a ground vehicle. The device consists of a porous skin or skins mounted on the trailing surface and/or aft portions of the ground vehicle. The porous skin is separated from the vehicle surface by a distance of at least the thickness of the porous skin. Alternately, the trailing surface, sides, and/or top surfaces of the ground vehicle may be porous. The device minimizes the strength of the separation in the base and wake regions of the ground vehicle, thus reducing drag.

24 Claims, 8 Drawing Sheets

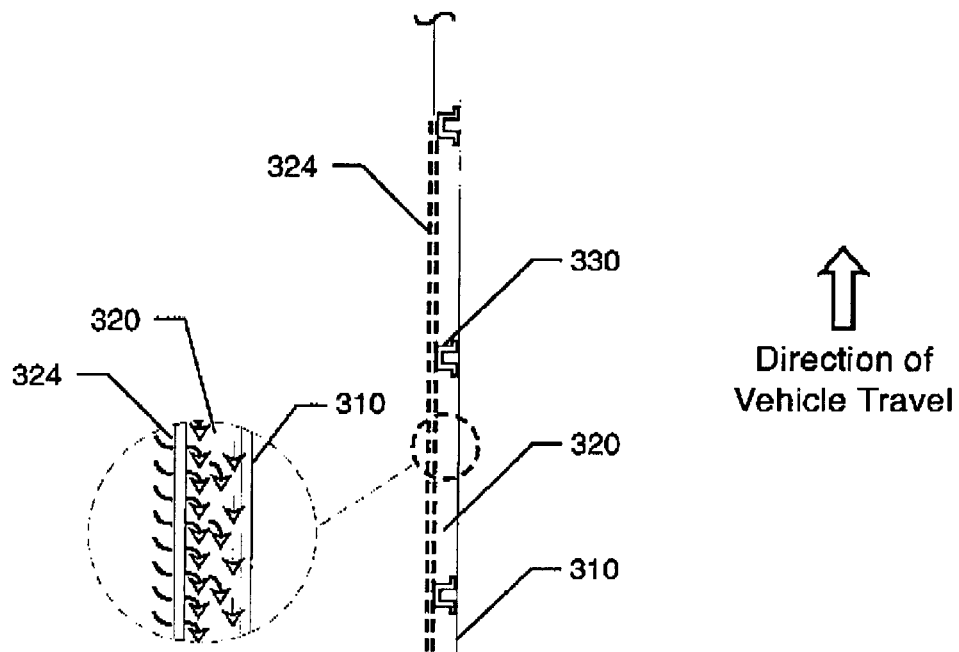
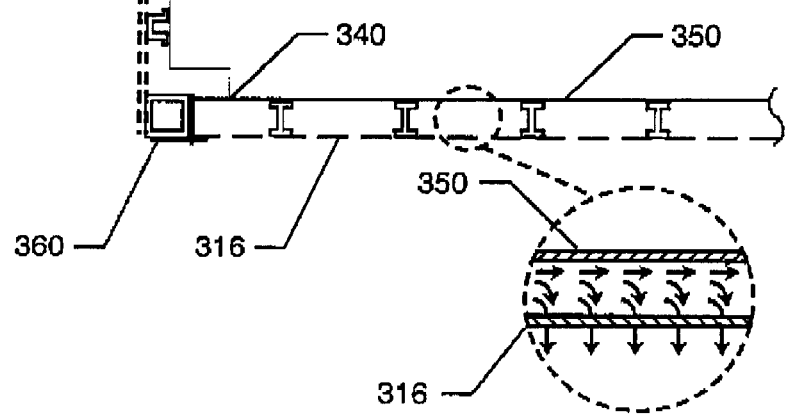
FIG. 7

BASE PASSIVE POROSITY FOR VEHICLE DRAG REDUCTION

ORIGIN OF THE INVENTION

The invention described herein was made by employees of the United States Government and may be used by and for the Government for governmental purposes without the payment of any royalties thereon or therefor.

CROSS-REFERENCE TO RELATED APPLICATIONS

This application is related to U.S. Pat. No. 6,286,892, which issued on Sep. 11, 2001.

BACKGROUND OF THE INVENTION

1. Field of Invention

The present invention relates generally to controlling drag on ground vehicles and, more particularly, to the passive control of drag on ground vehicles using porosity.

2. Description of the Related Art

Previous devices for controlling drag on ground vehicles have involved active devices that attempted to inhibit separation on the base, or aft portion, to create a predetermined best situation. These devices consist of flaps, turning vanes, vortex generators, and a wide range of suction and blowing concepts which add considerable weight to the overall vehicle weight and increase fuel consumption.

It is accordingly an object of the present invention to control drag on ground vehicles.

It is another object of the present invention to achieve the foregoing objects with a passive device.

It is a further object of the present invention to achieve the foregoing objects with minimal spatial and mass requirements.

It is yet another object of the present invention to accomplish the foregoing objects in a simple manner.

Additional objects and advantages of the present invention are apparent from the drawings and specification that follow.

BRIEF SUMMARY OF THE INVENTION

According to the present invention, the foregoing and additional objects are obtained by providing a drag reduction device for use on a ground vehicle. This device can consist of a porous outer skin having a thickness between about 1/16 inch (0.16 cm) and 1 inch (2.54 cm), preferably between 1/16 inch (0.16 cm) and 1/4 inch (0.635 cm), which is offset from the trailing surface and affixed to the trailing surface of the ground vehicle (e.g., the outer surface of the doors). The porous outer skin is separated from the trailing surface of the ground vehicle by a distance equal to at least the thickness of the porous skin (e.g., 0.25 inch [0.635 cm]or more), thereby forming a plenum therebetween. The surface porosity of the porous outer skin can be between about 10 and 20 percent. The porous outer skin may be fabricated from a porous material or by creating a number of perforations in a solid material. Additionally, it is also within the scope of the present invention tat a porous outer skin also be attached to one or more of the normal exterior sides and/or top surfaces of the trailer. If the perforation method is used, the maximum dimension of the perforations can be about 0.25 inch (0.635 cm) on the sides and top of the ground vehicle and about 0.50 inch (1.270 cm) on the trailing surface of the ground vehicle.

Alternatively, the typical existing trailing surface of the ground vehicle may itself be porous. Again the surface porosity can be between about 10 and 20 percent. The porosity may be caused by perforating the ground vehicle's existing trailing surface, and, depending on the thickness of the trailing surface, the maximum dimension of the perforations can vary, but it is preferably about 0.125 inch (0.3175 cm) for a trailing surface with a thickness of 0.25 inch (0.635 cm) or more. This perforating could possibly be done either during manufacture of the door or panel, or added later to a vehicle that has already been manufactured. For example, the vehicle's existing trailing surface can be the exterior surface of a rear door or doors, or it may be a full rear surface, (e.g., a non-openable rear panel) on the vehicle. It is within the scope of the present invention that virtually any variety of rear "door" (overhead, side by side, etc.) might be utilized, so long as an interior panel or surface is available to form a plenum between the outer and inner surfaces, to thus permit air flow therebetween.

Similarly, in another possible embodiment of the present invention, rather than attaching a porous surface to the sides or top of a vehicle, alternatively, a portion of the existing exterior surface of the vehicle body itself may be porous, for example, the normal exterior side and/or top surfaces of a trailer could be perforated. The perforating of the outer trailer surface can, for example, either be done during the original manufacture of the vehicle, or perforations could potentially be added after manufacture. Additionally, if the exterior surface of a trailer is perforated, then an inner non-perforated surface (or surfaces) should be positioned substantially parallel to the porous outer surface or skin. This internal surface can be separated from the side or top surfaces of the ground vehicle by a distance equal to at least the thickness of the porous skin (with a minimum of about 0.25 inch) to form a plenum between the porous and non-porous surfaces. In at least one embodiment, the perforations can extend a substantial distance from the trailing surface of the vehicle along the side(s) and/or top, for example, between about 5 and 10 percent of the total length of the trailer can be perforated, and the porosity can be between about 10 to 20 percent of the perforated surface area.

BRIEF DESCRIPTION OF THE DRAWINGS

FIGS. 6A and 68 shows an enhanced top view of airflow through a cross-section of a side and rear portion of the vehicle shown in FIG. 6;

FIG. 7 shows another embodiment of the present invention wherein the existing exterior surfaces of the vehicle are perforated; and FIGS. 7A and 7B show an enhanced top view of air flow through a cross-section of a side and rear portion of the vehicle shown in FIG. 7.

DETAILED DESCRIPTION

Figure 1:
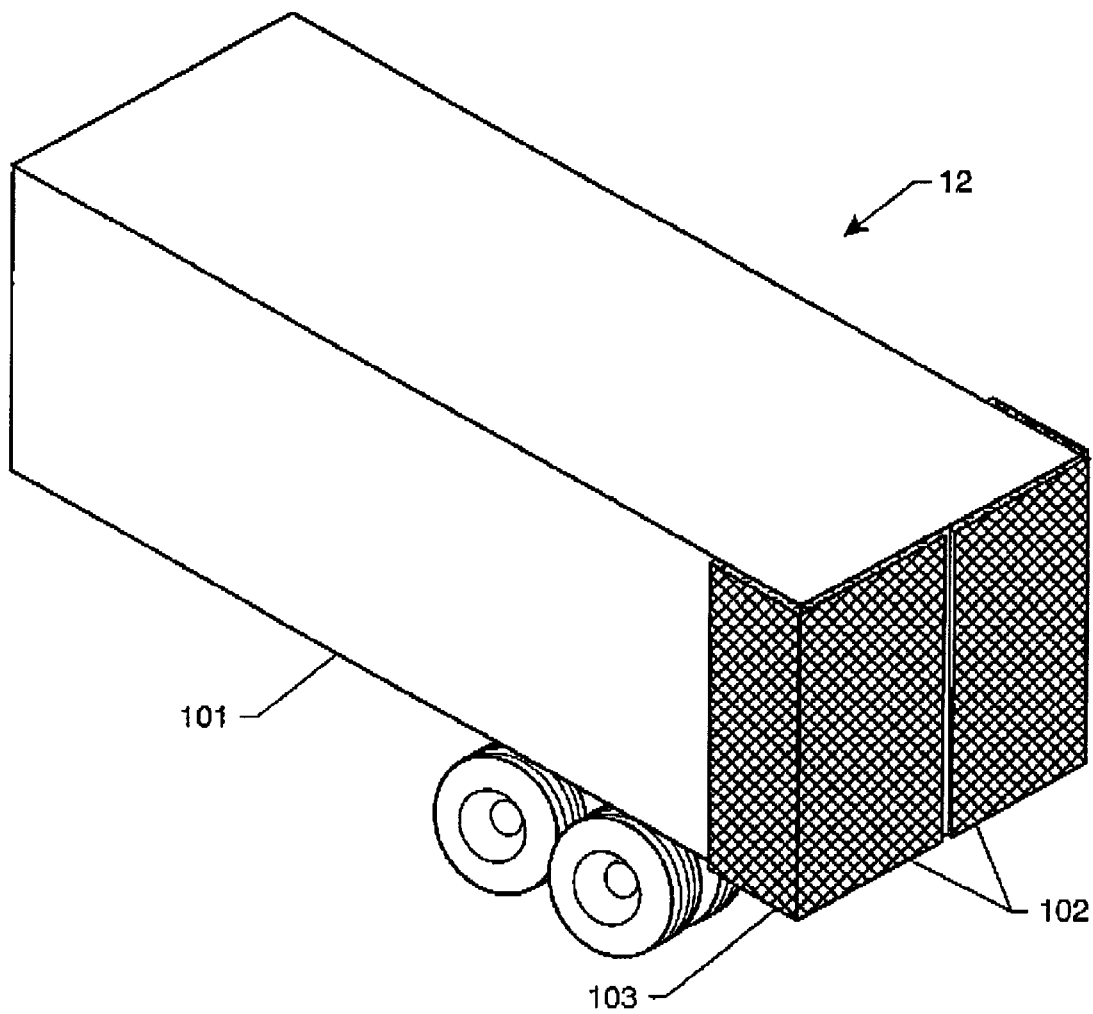
FIG. 1 shows the rear portion of a vehicle with a porous skin mounted on the trailing surface and side thereof.

FIG. 1 shows the rear portion of a vehicle with a porous skin mounted on the trailing surface and side thereof. Two rear portions 102 of porous skin are each attached to a corresponding trailing surface of a door located at the rear of a trailer. Side portions 103 of porous skin are attached to each side of the trailer, and extend from the trailing surfaces toward the front of the trailer at least 5 percent of the length of the trailer and at most 10 percent of the length of the trailer (one side not shown).

Figure 1A:
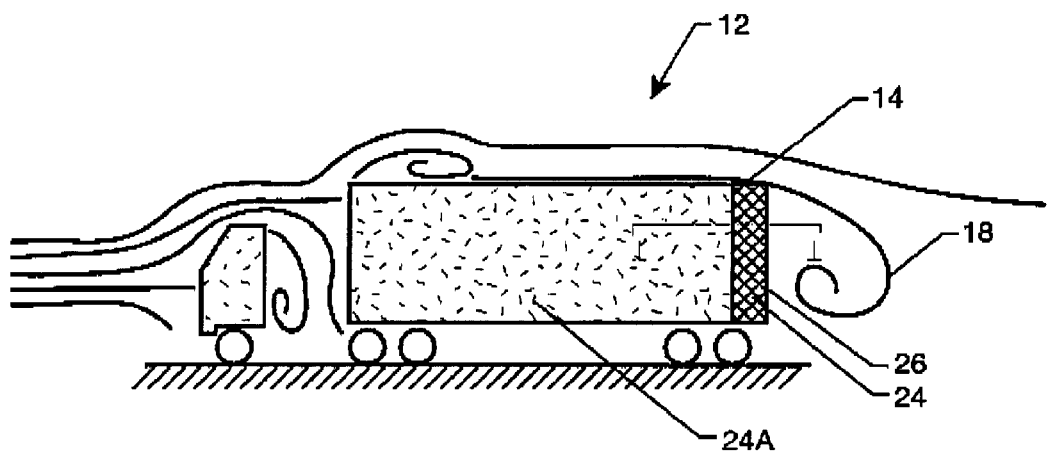
FIGS. 1A and 1B are side and top views showing a porous skin mounted on the trailing surface, sides, and top of a ground vehicle.
Figure 1B:
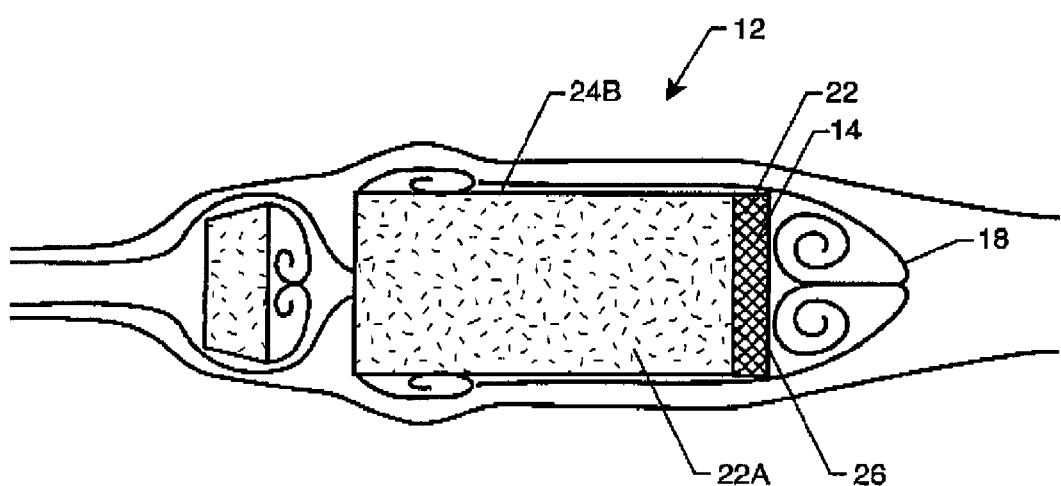

FIGS. 1A and 1B show a ground vehicle 12. A trailing surface 16 (see FIG. 2A) of the ground vehicle 12 can be covered with a porous skin 14, consisting of portions 22, 24, and 26 portion 24 further consisting of right and left components 24R and 24L). The porous skin 14 also extends along the top 22a and side surfaces (24a, 24b) of the depicted trailer 12. The thickness of the porous outer skin 14 can be between about 1/16 inch (0.16 cm) and 1 inch (2.54 cm), preferably between 1/16 inch (0.16 cm) and 1/4 inch (0.635 cm) and should be chosen based on structural requirements of the ground vehicle. The porosity of the porous skin 14 can be between about 10 and 30 percent. The porous skin 14 may be made from a porous material, such as sintered metal, or from a solid material, such as steel or fiberglass that has been perforated, however, the maximum dimension of the perforations should be no more than about 0.125 inch (0.3175 cm) with a skin thickness to hole ratio of about 3 [e.g., hole diameter of 0.125 inch would require a skin thickness of 0.375 inch ] on the sides 24 and top 22 portions of the ground vehicle. The maximum dimension of the perforations should be no more than about 0.50 inch (1.27 cm) on the portion 26 of the trailing surface 16 of the ground vehicle (as shown in FIG. 3) in order to minimize the disturbance of the external flow field.

Figure 2A:
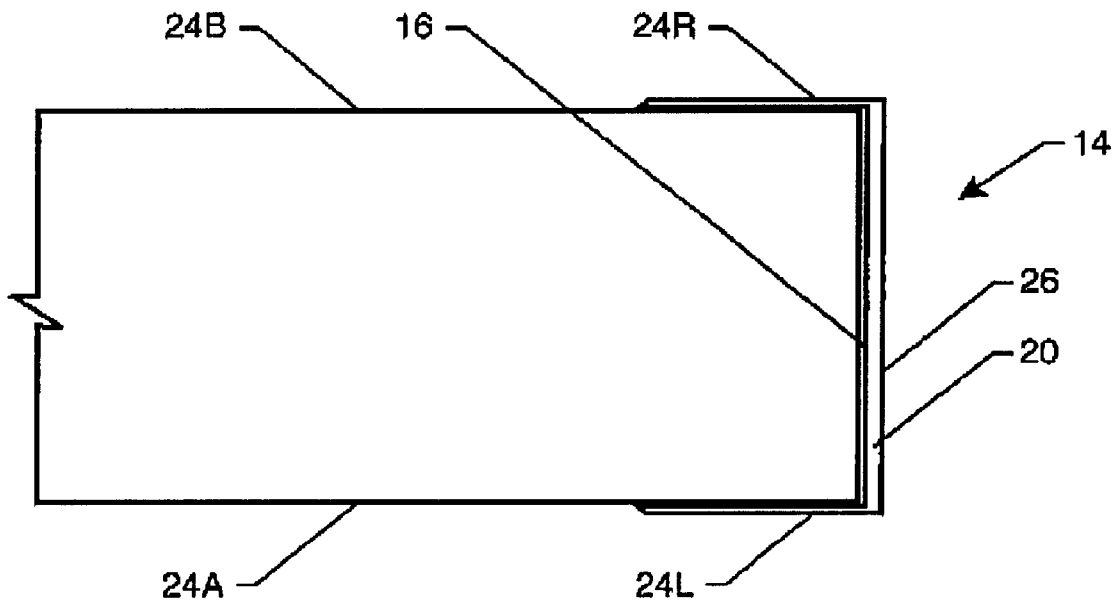
FIG. 2A is a cross sectional view across line II—II of FIG. 1A for a ground vehicle having a porous skin separated from the trailing surface.

FIG. 2A shows a porous skin 14 mounted on the trailing surface 16 and side 24a of the ground vehicle, as described above, and forming a plenum 20 contained by the porous skin 14, trailing surface 16, and the sides 24a, and 24b. The porous skin 14 must be mounted over the plenum 20 such that there is minimal blockage in all directions. The depth of plenum 20 on the trailing surface and sides or top, should be no less than about the thickness of the porous skin 14, but no less than about 0.25 inch (0.635 cm).

Figure 2B:
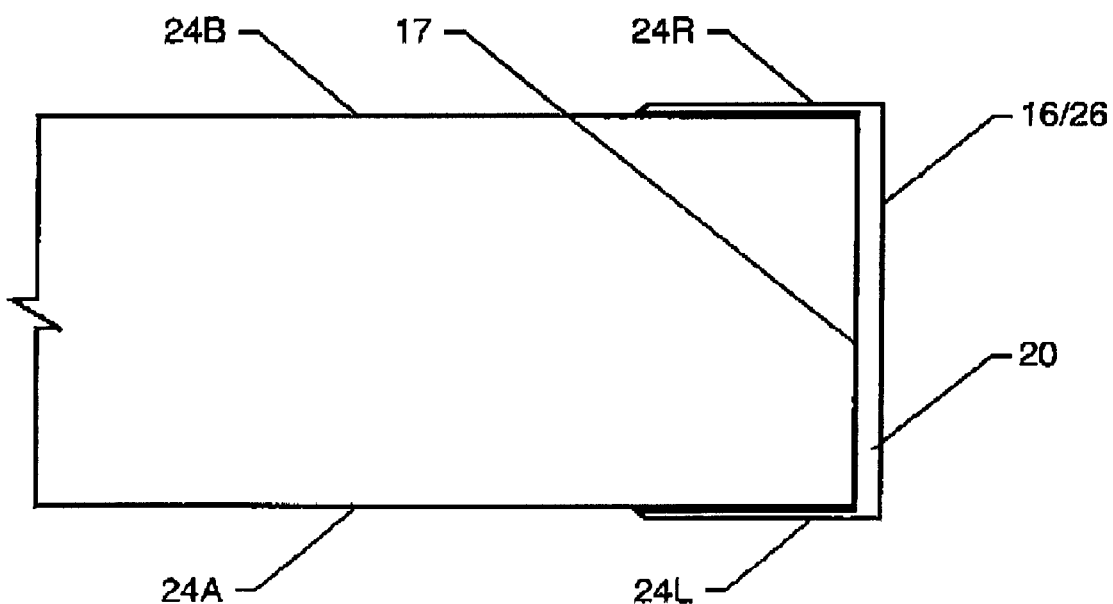
FIG. 2B is a cross sectional view across line II—II of FIG. 1A for a ground vehicle having a porous trailing surface.

An alternate embodiment of the present invention is to adapt the existing trailing edge 16 of the ground vehicle 12 by, for example, perforating the outer surface of the rear doors of the ground vehicle as shown in FIG. 2B. A plenum 20 could then be formed between the extreme perforated outer surface 26 of the doors and an inner non-perforated surface 17. The surface porosity should be between about 10 and 30 percent and the size of the perforations depends on the thickness of the door's trailing surface 16. For doors having a trailing surface thickness of ½ inch (1.27 cm) or more, the maximum dimension of the perforations is about 0.25 inch (0.635 cm). Additionally, any stiffening or insulating structures found within the rear door or panel must also be sufficiently porous or vented so as to allow airflow between the outer perforated skin and the inner surface.

Figure 3:
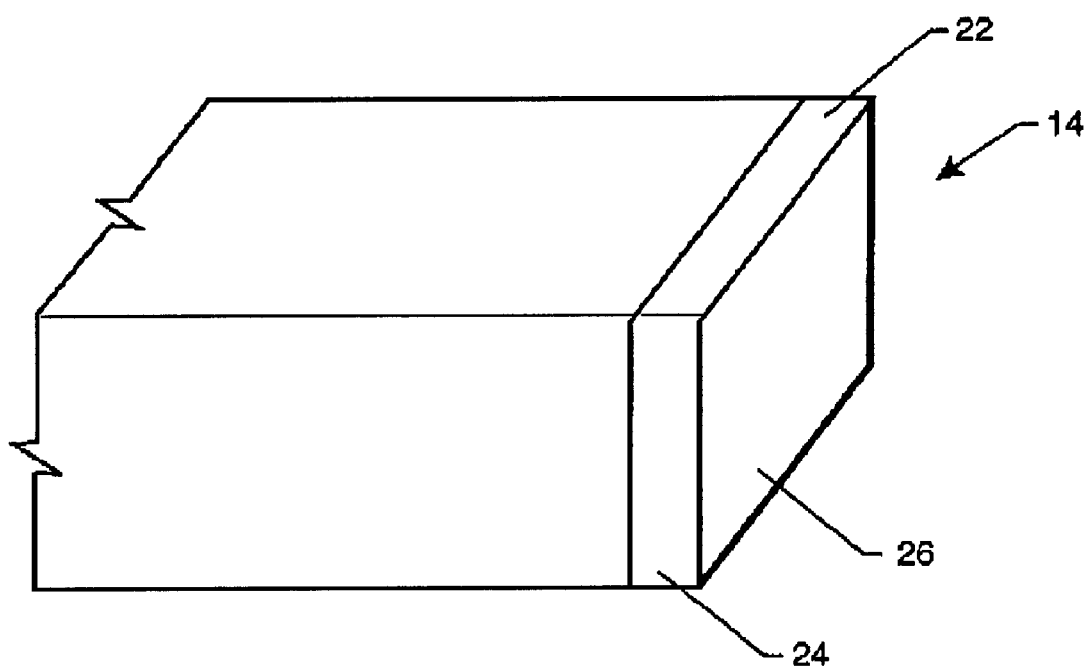
FIG. 3 is a perspective view of the trailing end of a ground vehicle.

FIG. 3 is similar to FIG. 1. wherein a porous skin 14 covers both the top of the trailer (with portion 22) and the sides of the trailer (with portions 24). The trailing surface also has attached thereto an offset porous skin portion 26.

Figure 4A:
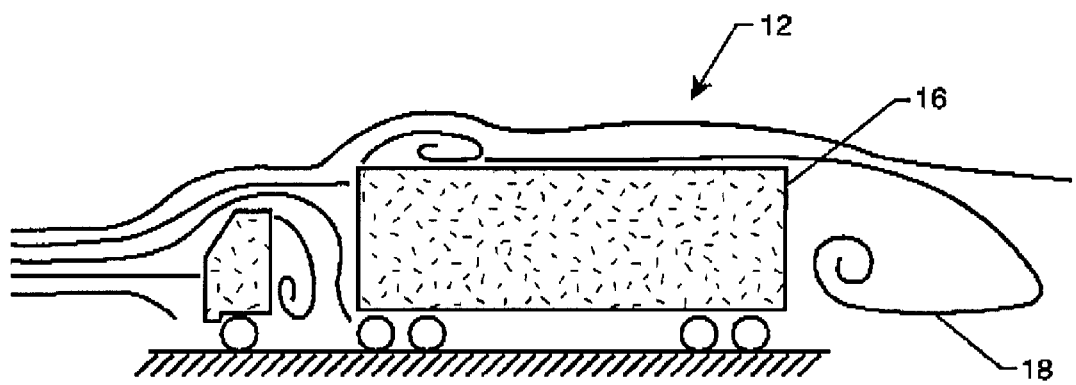
FIGS. 4A and 4B are side and top views showing the wake formed on a ground vehicle without a porous skin mounted on the trailing surface of a ground vehicle.
Figure 4B:
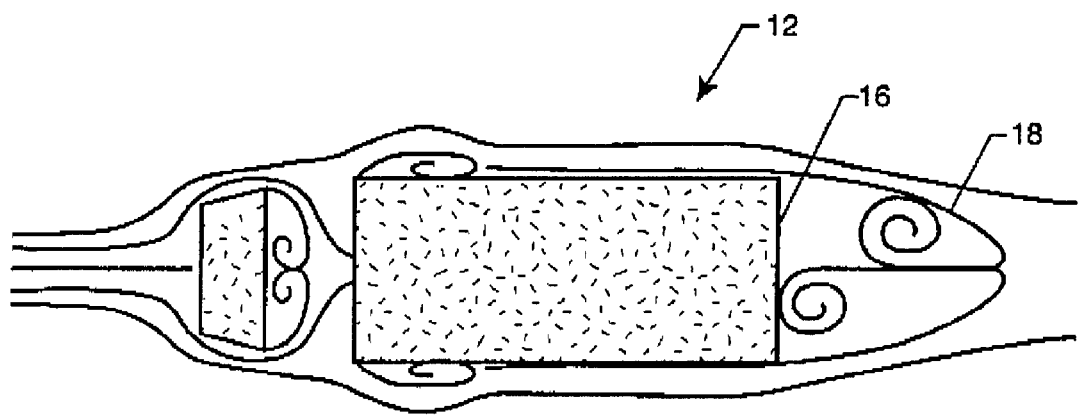

FIGS. 4A and 4B show a ground vehicle without a porous skin attached. The wake 18 is chaotic (i.e., asymmetric), larger and stronger than the wake 18 shown on FIGS. 1A and 1B, which is symmetric, smaller and weaker.

The present invention allows the flow over the ground vehicle 12 to turn around the corners at the base of the vehicle reducing the strength of the separation in the wake 18 of the vehicle. This allows the wake 18 to be shorter, and more symmetric, and reattachment of the flow in the wake 18 occurs sooner, reducing drag. This phenomenon occurs at all speeds, with reductions in drag of 20 percent or more shown in wind tunnel tests.

Figure 5:
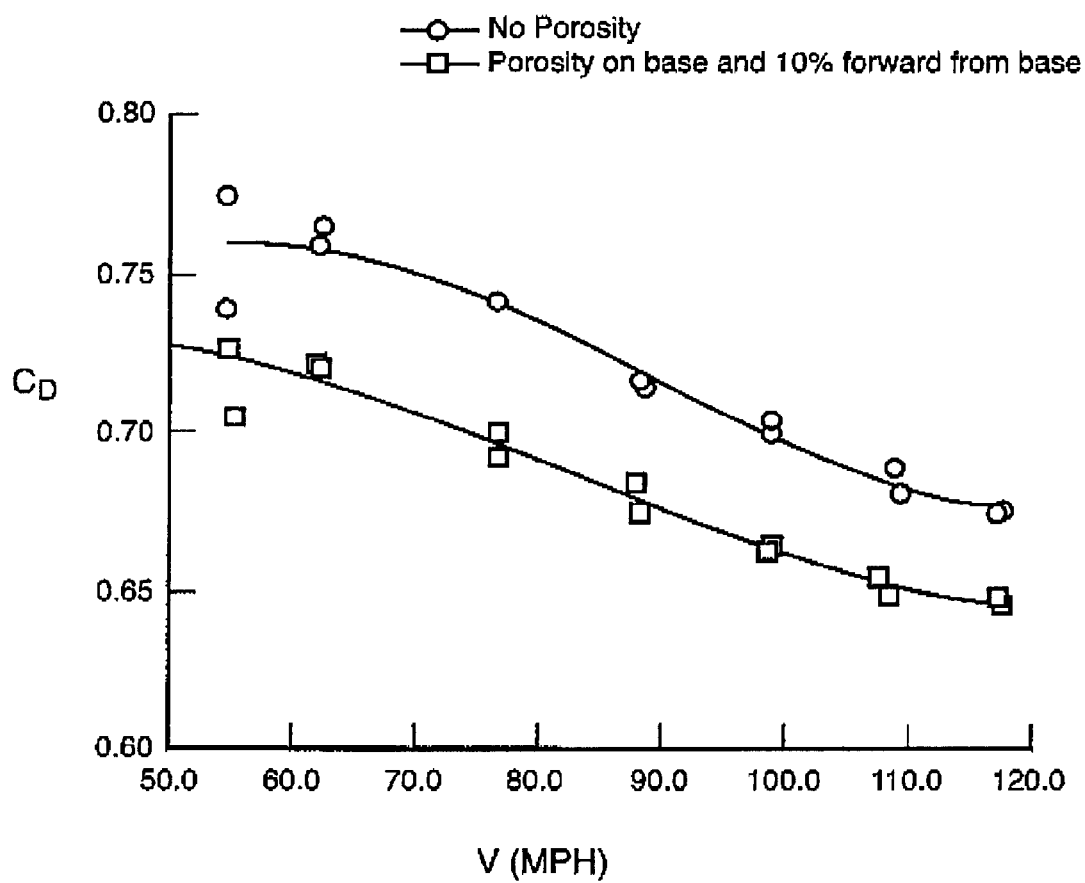
FIG. 5 is a graph showing drag characteristics of a ground vehicle having a porous skin and drag characteristics of a ground vehicle without a porous skin.

FIG. 5 shows a comparison between (lower curve) the drag characteristics of a tractor-trailer with a short cab, and with a porous skin mounted on the trailing surface, sides, and top of the trailer, such that the porous skin extends along the sides and top a distance of about 10 percent of the total length of the trailer forward of the trailing surface, and (upper curve)a tractor-trailer with a short cab with no porous skins. The graph plots the coefficient of drag ($C_D$) versus the velocity (mph). As can be seen, the coefficient of drag is consistently lower for the vehicle with the porous skin.

Figure 6:
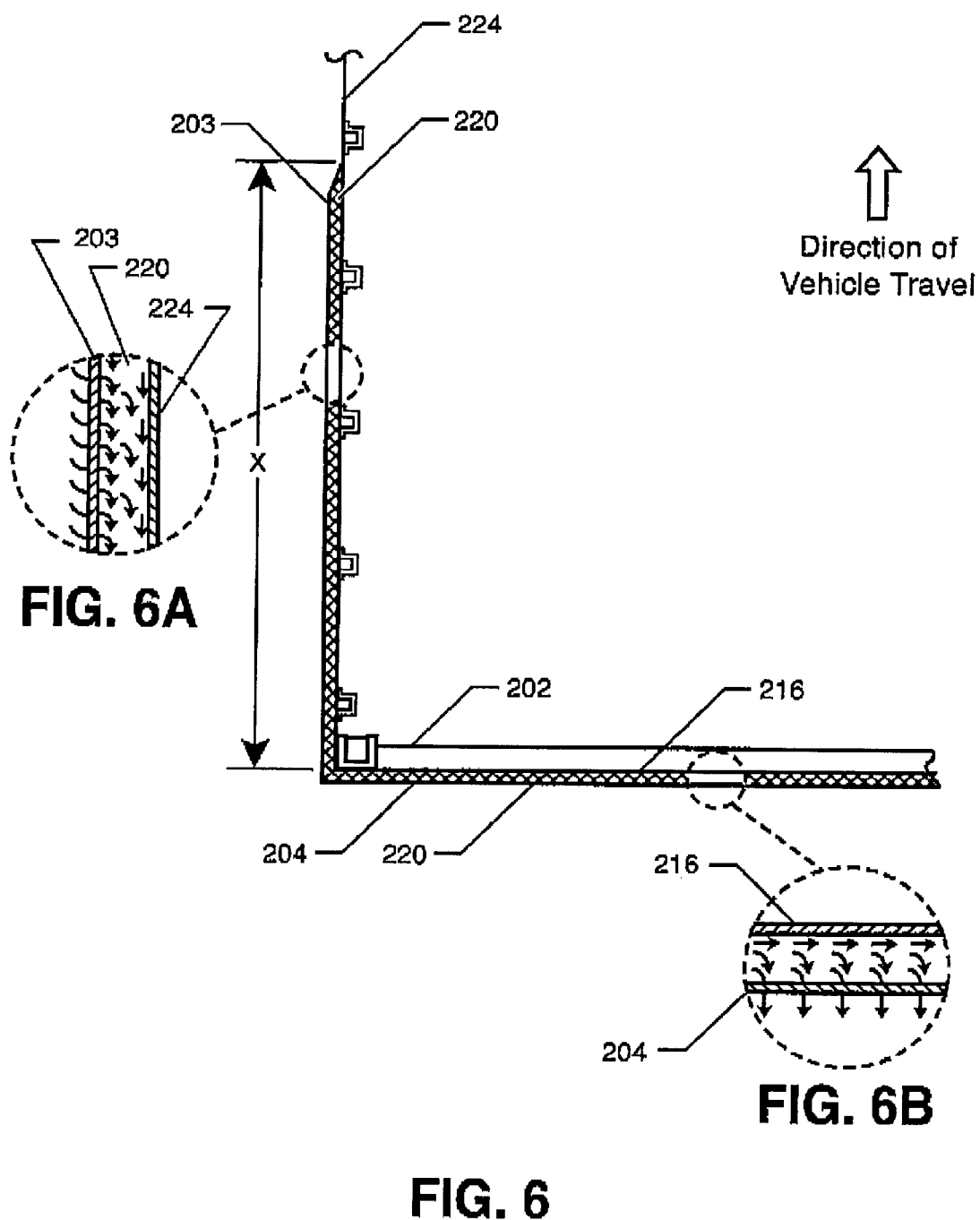
FIG. 6 is a cross-section of an aft portion of a tractor-trailer as described above in reference to FIG. 1.

FIG. 6 shows a cross-section of the aft or base portion of a tractortrailer, such that the porous surface 204 is mounted on the trailing surface 216 of the trailer, with a portion 203 thereof extending a distance X, along the side 224 of the vehicle. This distance X should preferably be no less than about 5 percent and no more than about 10 percent of the total length of the trailer forward of the trailing surface. A contiguous enclosure, or plenum, 220 is formed between the porous surface sections 203, 204 and the solid side panel 224 and trailing edge or surface 216. This trailing edge 216 can be part of a rear door or back panel of the trailer 202, or potentially could consist of a separate additional structure.

FIGS. 6A and 6B show an enhanced top view of airflow through a cross-section of a side and rear portion of the vehicle shown in FIG. 6. FIG. 6A shows how, due to a pressure differential between the side and rear of the trailer, air is pulled through the porous surface or skin 203 on the side of the truck and into the plenum 220. This air can then travel through the plenum 220 and exit out the perforated surface 204 which extends across the trailing surface 216 of the trailer, as shown in FIG. 6B. As stated above, this allows the airflow over the ground vehicle to turn around the corners at the rear of the vehicle, thereby reducing the strength of the separation in the wake 18 of the vehicle. This allows the wake 18 to be shorter, more symmetric and reattachment of the flow in the wake 18 occurs sooner, reducing drag.

FIG. 7 shows another embodiment of the present invention wherein an existing exterior surface, or surfaces, of the vehicle are perforated. That is to say, either the standard existing sides 324 and/or top (not shown) of the vehicle could be perforated. In at least one embodiment an additional inner surface or sleeve, or sleeves, 310 can be inserted in the interior of the vehicle, preferably substantially parallel to the outer exterior surface of the vehicle, in this case a trailer, to form a plenum 320 between the perforated outer surface(s) and the inner sleeve(s) 310. This perforation and additional sleeve(s) can be added either as original equipment during the manufacture of the truck, or could potentially be added later to a standard vehicle. This internal surface(s) can be separated from the exterior surface(s) of the ground vehicle by a distance equal to at least the thickness of the porous skin. Additionally, stiffening and/or attachment devices, such as vertical stanchions 330, can be located between the outer perforated panel and the sleeve; however, these devices must be themselves suitably perforated or vented such as not to significantly block the airflow through the plenum. In at least one embodiment, the perforations can extend a substantial distance from the trailing surface of the vehicle along the side(s) and/or top, for example, between about 5 and 10 percent of the total length of the trailer can be perforated (although other distances are possible). The maximum dimension of the perforations should be no more than about 0.25 inch (0.635 cm) on the sides 24 and/or top 22 of the ground vehicle.

It is within the scope of the present invention that this possible feature, wherein the existing exterior top and/or side surfaces of a vehicle are perforated, can be used in combination with a similarly perforated existing trailing surface of a vehicle, or with the addition of a perforated skin onto the trailing surface of the vehicle (these, and other potential trailing surface embodiments which can be utilized with this feature, were described in more detail hereinabove). FIG. 7 depicts a perforated typical existing trailing surface, such as the outer panel of a rear door, wherein the inner panel 350 of the same door (or rear trailer panel) remains solid to form a plenum with the now perforated outer surface (in another embodiment it would also be possible to add an additional internal panel within the door). Further, for the shown embodiment in FIG. 7 to operate optimally, the plenums formed on the sides and/or tops of the trailer, must be in substantially unobstructed communication with the plenum formed with the trailing surface, in order to permit airflow therebetween. Additionally, a seal 340 can be positioned to enable this substantially unobstructed communication between the plenums to exist when the trailer door(s) are closed (and thereby also allowing the door(s) to be opened).

Similar to FIGS. 6A and 6B, FIGS. 7A and 7B show an enhanced top view of airflow through a cross-section of a side and rear portion of the vehicle shown in FIG. 7. FIG. 7A shows how, due to a pressure differential between the side and rear of the trailer, air is pulled through the porous side portions 324 on the side of the truck and into the plenum 320. This air can then travel through the plenum 320, around the hinge 360, and then exit out the rear perforated portion 316. As stated above, this allows the airflow over the ground vehicle to turn around the corners at the rear of the vehicle, thereby reducing the strength of the separation in the wake of the vehicle. This allows the wake to be shorter, more symmetric and reattachment of the flow in the wake occurs sooner, reducing drag.

It should be noted that the inventions as described in the embodiments above, are not limited to the depicted applications, namely, to the aft portion of a truck or trailer, but can be used with a variety of vehicles such as the back of a panel truck (such as a standard mail or UPS truck). Many other improvements, modifications, and additions will be apparent to the skilled artisan without departing from the spirit and scope of the present invention as described herein and defined in the following claims.

What is claimed is:

1. A drag reduction device for use on a ground vehicle, comprising:

a porous outer surface attached to the aft portion of a ground vehicle;

a substantially solid inner surface;

said porous outer surface comprising a first portion and at least one second portion:

said first portion being attached to a trailing surface of the ground vehicle;

said at least one second portion being attached to at least one side of said ground vehicle; and said porous outer surface and said substantially solid inner surfaces being separated from and substantially parallel to one another to form a space therebetween, such that the porous outer surface acts as a means for permitting the entrance and exit of air into and out of said space, whereby the asymmetric character of the external trailing wake flow field of the ground vehicle is changed to a substantially steady and laterally symmetric trailing wake flow field.

2. The drag reduction device according to claim 1, wherein the porous outer surface has a thickness between about ¹⁄₁₆ inch (0.16 cm) and 1 inch (2.54 cm).

3. The drag reduction device according to claim 1, wherein the porous outer surface has a surface porosity between about 10 and 20 percent.

4. The drag reduction device according to claim 1, wherein the space formed between said porous outer surface and said substantially solid inner surfaces has a width equal to at least the thickness of said porous outer surface.

5. The drag reduction device according to claim 1, wherein said first portion comprises perforations having a maximum dimension of about 0.5 inch.

6. The drag reduction device according to claim 1, wherein said at least one second portion comprises perforations having a maximum dimension of about 0.25 inch.

7. A drag reduction device for a ground vehicle, comprising:

a porous outer surface on the aft portion of a ground vehicle;

a substantially solid inner surface;

said porous outer surface comprising a first portion and at least one second portion;

said first portion forming a trailing surface of the around vehicle;

said at least one second portion forming at least a portion of at least one side of said ground vehicle: and said porous outer surface and said substantially solid inner surfaces being separated from and substantially parallel to one another to form a plenum therebetween, such that the porous outer surface acts as a means for permitting the entrance and exit of air into and out of said plenum, whereby the asymmetric character of the external trailing wake flow field of the ground vehicle is altered such that drag is reduced.

8. The drag reduction device according to claim 7, wherein the porous outer surface has a thickness between about ¹⁄₁₆ inch (0.16 cm) and 1 inch (2.54 cm).

9. The drag reduction device according to claim 7, wherein the porous outer surface has a surface porosity between about 10 and 20 percent.

10. The drag reduction device according to claim 7, wherein the plenum formed between said porous outer surface and said substantially solid inner surfaces has a width equal to at least the thickness of said porous outer surface.

11. The drag reduction device according to claim 7, wherein said first portion comprises perforations having a maximum dimension of about 0.5 inch.

12. The drag reduction device according to claim 7, wherein said at least one second portion comprises perforations having a maximum dimension of about 0.25 inch.

13. A method for reducing drag of a ground vehicle comprising the steps of:

attaching a porous outer surface to the aft portion of a ground vehicle;
   said porous outer surface comprising a first portion and at least one second portion;
   said first portion being attached to a trailing surface of the ground vehicle, and
   said at least one second portion being attached to at least one side of said ground vehicle;

aligning said porous outer surface with a corresponding substantially solid inner surface; and positioning said porous outer surface and said corresponding substantially solid inner surfaces separated from and substantially parallel to one another to form a space therebetween, such that the porous outer surface acts as a means for permitting the entrance and exit of air into and out of said space, whereby the asymmetric character of the external trailing wake flow field of the ground vehicle is changed to a substantially steady and laterally symmetric trailing wake flow field.

14. The drag reduction method according to claim 13, wherein the porous outer surface has a thickness between about 1/16 inch (0.16 cm) and 1 inch (2.54 cm).

15. The drag reduction method according to claim 13, wherein the porous outer surface has a surface porosity between about 10 and 20 percent.

16. The drag reduction method according to claim 13, wherein the space formed between said porous outer surface and said corresponding substantially solid inner surfaces has a width equal to at least the thickness of said porous outer surface.

17. The drag reduction method according to claim 13, wherein said first portion comprises perforations having a maximum dimension of about 0.5 inch.

18. The drag reduction method according to claim 13, wherein said at least one second portion comprises perforations having a maximum dimension of about 0.25 inch.

19. A method for reducing drag of a ground vehicle comprising the steps of:

perforating the outer surface of the aft portion of a ground vehicle to produce a porous outer surface;
   said porous outer surface comprising a first portion and at least one second portion;
   said first potion forming a trailing surface of the ground vehicle, and
   said at least one second portion forming at least a portion of at least one side of said ground vehicle;

aligning said porous outer surface with a corresponding substantially solid inner surface; and positioning said porous outer surface and said corresponding substantially solid inner surfaces separated from and substantially parallel to one another to form a space therebetween, such that the porous outer surface acts as a means for permitting the entrance and exit of air into and out of said space, whereby the asymmetric character of the external trailing wake flow field of the ground vehicle is changed to a substantially steady and laterally symmetric trailing wake flow field.

20. The drag reduction method according to claim 19, wherein the porous outer surface has a thickness between about 1/16 inch (0.16 cm) and 1 inch (2.54 cm).

21. The drag reduction method according to claim 19, wherein the porous outer surface has a surface porosity between about 10 and 20 percent.

22. The drag reduction method according to claim 19, wherein the space formed between said porous outer surface and said corresponding substantially solid inner surfaces has a width equal to at least the thickness of said porous outer surface.

23. The drag reduction method according to claim 19, wherein said first portion comprises perforations having a maximum dimension of about 0.5 inch.

24. The drag reduction method according to claim 19, wherein said at least one second portion comprises perforations having a maximum dimension of about 0.25 inch.

\* \* \* \* \*

UNITED STATES PATENT AND TRADEMARK OFFICE
CERTIFICATE OF CORRECTION

PATENT NO.   : 6,616,218 B2
DATED        : September 9, 2003
INVENTOR(S)  : Steven X.L. Bauer et al.

It is certified that error appears in the above-identified patent and that said Letters Patent is hereby corrected as shown below:

<u>Column 1,</u>
Line 61, replace "present invention tat a porous outer skin also be attached"
with -- present invention that a porous outer skin also be attached --

<u>Column 4,</u>
Line 48, replace "comers at the rear of the vehicle, thereby reducing the"
with -- corners at the rear of the vehicle, thereby reducing the --.

<u>Column 6,</u>
Line 37, replace "said first portion forming a trailing surface of the around"
with -- said first portion forming a trailing surface of the ground --.

<u>Column 8,</u>
Line 5, replace "said first potion forming a trailing surface of the ground"
with -- said first portion forming a trailing surface of the ground --.

Signed and Sealed this

Twentieth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO.      : 6,616,218 B2
DATED           : September 9, 2003
INVENTOR(S)     : Steven X.L. Bauer et al.

It is certified that error appears in the above-identified patent and that said Letters Patent is hereby corrected as shown below:

Column 4,
Line 27, replace "a tractortrailer, such that the porous surface" with -- a tractor-trailer, such that the porous surface --.

Signed and Sealed this

Twenty-second Day of March, 2005

JON W. DUDAS
*Director of the United States Patent and Trademark Office*